United States Patent

Dorr

[15] 3,699,322

[45] Oct. 17, 1972

[54] SELF-CHECKING COMBINATIONAL LOGIC COUNTER CIRCUIT

[72] Inventor: Robert Charles Dorr, Plainfield, Ill.

[73] Assignee: Bell Telephone Laboratories Incorporated, Murray Hill, N.J.

[22] Filed: April 28, 1971

[21] Appl. No.: 138,074

[52] U.S. Cl. ..............................235/153, 235/92 EC

[51] Int. Cl. ..............................G06f 11/10

[58] Field of Search..235/153, 92 EC; 340/146.1 AG

[56] References Cited

UNITED STATES PATENTS 3,331,953 7/1967 Rouzier ....................235/153

3,555,255 1/1971 Toy ..........................235/153

3,567,916 3/1971 Fullton, Jr. ................235/153

*Primary Examiner*—Charles E. Atkinson

*Attorney*—R. J. Guenther and R. B. Ardis

[57] ABSTRACT

A self-checking combinational logic counter providing three predicted parity change bits. One of the bits is derived by logic independent of the counting logic, the other two bits being derived by logic dependent upon the operation of the counting logic. The three bits are compared to detect a match indicating an accurate prediction of a parity change or retention of original parity.

10 Claims, 3 Drawing Figures

INVENTOR
R. C. DORR
BY William H. Kamstra
ATTORNEY

SELF-CHECKING COMBINATIONAL LOGIC COUNTER CIRCUIT

BACKGROUND OF THE INVENTION

This invention relates to error detection circuits and more particularly to such circuits adapted for use in connection with counting arrangements employed in fault conscious data processing systems.

The function of binary counting circuits in a central processor, for example, of a data processing system is well known in the art. Data processing tasks such as program counting and timing control, to name two, are normally performed by means of a counting operation. This operation, which essentially acts to advance the binary data stored in a register in increments of one at each step, is frequently performed during a transfer of the data from one register to another within the system. In any data processing operation, the accuracy of the ultimate output demands the error-free performance of logic and arithmetic operations as well as the error-free transfer of the data between points in the system. This demand becomes more urgent as data processing systems must deliver uninterrupted service to customers. When, in addition, the maintenance philosophy of a system or its components dictates that these be largely self-supervisory in checking for errors, an even greater need exists for circuit means and operations for ensuring that a maximum of simultaneous errors is rapidly and reliably detected.

One known method of detecting errors in counting operations is to add a parity bit to the data bits of a word to produce a word having either an even or odd number of binary "1s." In even parity, for example, an extra "1" is added to a word containing an odd number of "1s" so that the total number of "1s" will be even. A limitation on this method, of course, is the fact that if a double error has occurred, the error will go undetected since the total number of "1s" will still be even. Although the possibility of detecting multiple errors may be increased by increasing the number of parity bits, such measures also add to the complexity of the error detection circuitry and hence to the ultimate cost of the system.

During a counting operation, it is clear that the increment of change in the data being operated upon may also dictate a change in the parity bit of the word. Thus, an increment of one on a data word containing an even number of consecutive rightmost "1s" will change the parity bit. Such a new parity bit can be generated in response to the output of the counting logic circuit as is known. A new parity bit may also be predicted at the same time that the incremented data word is determined. Manifestly, the latter method for obtaining a changed parity bit is preferable when counting occurs in parallel and where the highest possible counting speed is required. A number of approaches to the derivation of such predicted parity change information are known in the art. A predicted parity change bit may thus be generated either dependent upon or independent of the operation of the counter logic. A predicted parity change bit, for example, may be derived dependent upon counter logic by detecting a set of even or odd consecutive rightmost "1s" in the data word to be incremented. Generally, however, in self-checking counters, a single predicted parity change bit is utilized to determine the actual parity of the output count which is then compared with an independently derived parity for the output count.

It is an object of this invention to provide a new and improved error detection circuit.

Another object of this invention is a novel self-checking parity change prediction circuit useful in conjunction with binary counters.

A further object of this invention is a new and improved circuit for detecting errors during the transfer and incrementing of data between storage registers and during logic operations thereupon in a data processing system.

SUMMARY OF THE INVENTION

The foregoing and other objects of this invention are realized in one illustrative embodiment thereof in which a data word is incremented by one during a transfer between a source and a destination register in a data processing system. A plurality of predicted parity change information bits are derived, both independent of and dependent upon the operation of the count logic circuits. The input count is incremented by the serial operation of two combinatorial logic operators; the first, the "1s" logic, detects the set of consecutive rightmost "1s" in the input data word; the second operator, the count logic, responds to the output of the "1s"logic by complementing specified bits of the input data word. As a result, the incremented data word appears as the output of the count logic. The specified bits of the input data word that are complemented correspond to those bits which are members of the set of rightmost consecutive "1s" in the input data word plus the next higher order bit.

The integrity of the transfer and counting operation are checked by first deriving and then comparing three predicted parity change information bits. A parity change bit indicates whether or not the incrementing of the transferred data word induces a change in parity. The incrementing of a data word having an even number of consecutive rightmost "1s" indicates a change in parity because the addition of a binary "1" to this word results in a sum with parity opposite to its unincremented value. The first predicted parity change bit is derived by logic distinct and independent of the counting logic. This parity change logic indicates a parity change when it identifies in the input word the set of rightmost consecutive "1s" even in number and generates a change bit representing the indicated change. The second and third predicted parity change bits are derived by logic dependent upon the operation of the counting logic. The rightmost "1s" information from the "1s" logic is combined with the check logic to generate one parity change bit based on the odd-numbered rightmost consecutive "1s" of the data word and a second parity change bit based on the even-numbered rightmost consecutive "1s" of the data word. Checking logic is then provided to compare the three parity change bits thus generated to disclose any error in counting, transmission or checking, of the data word.

It is a feature of this invention that, by utilizing two distinct circuits for parity prediction, that is, independent and dependent, single and multibit errors in both the checking and counting circuits may be detected.

BRIEF DESCRIPTION OF THE DRAWING

The foregoing and other objects and features of this invention together with its organization and operation will be better understood from a consideration of the detailed description of one illustrative embodiment thereof which follows when taken in conjunction with the accompanying drawing in which.

DETAILED DESCRIPTION

Figure 1:
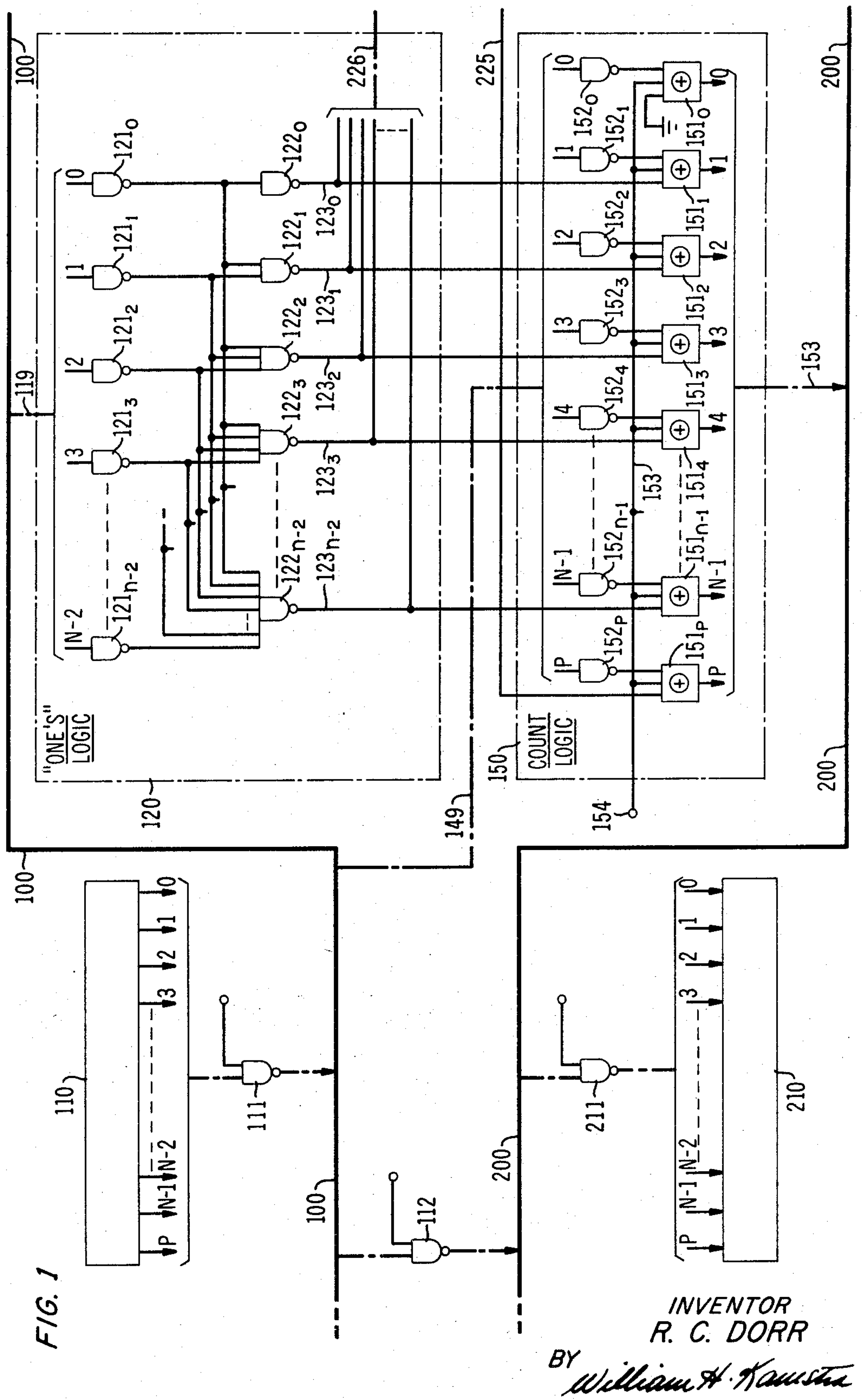
FIGS. 1 and 2 combined depict in logic symbol form an illustrative error detection arrangement according to this invention for checking the accuracy of a counting operation during the transfer of data between two registers.
Figures 2, 3:
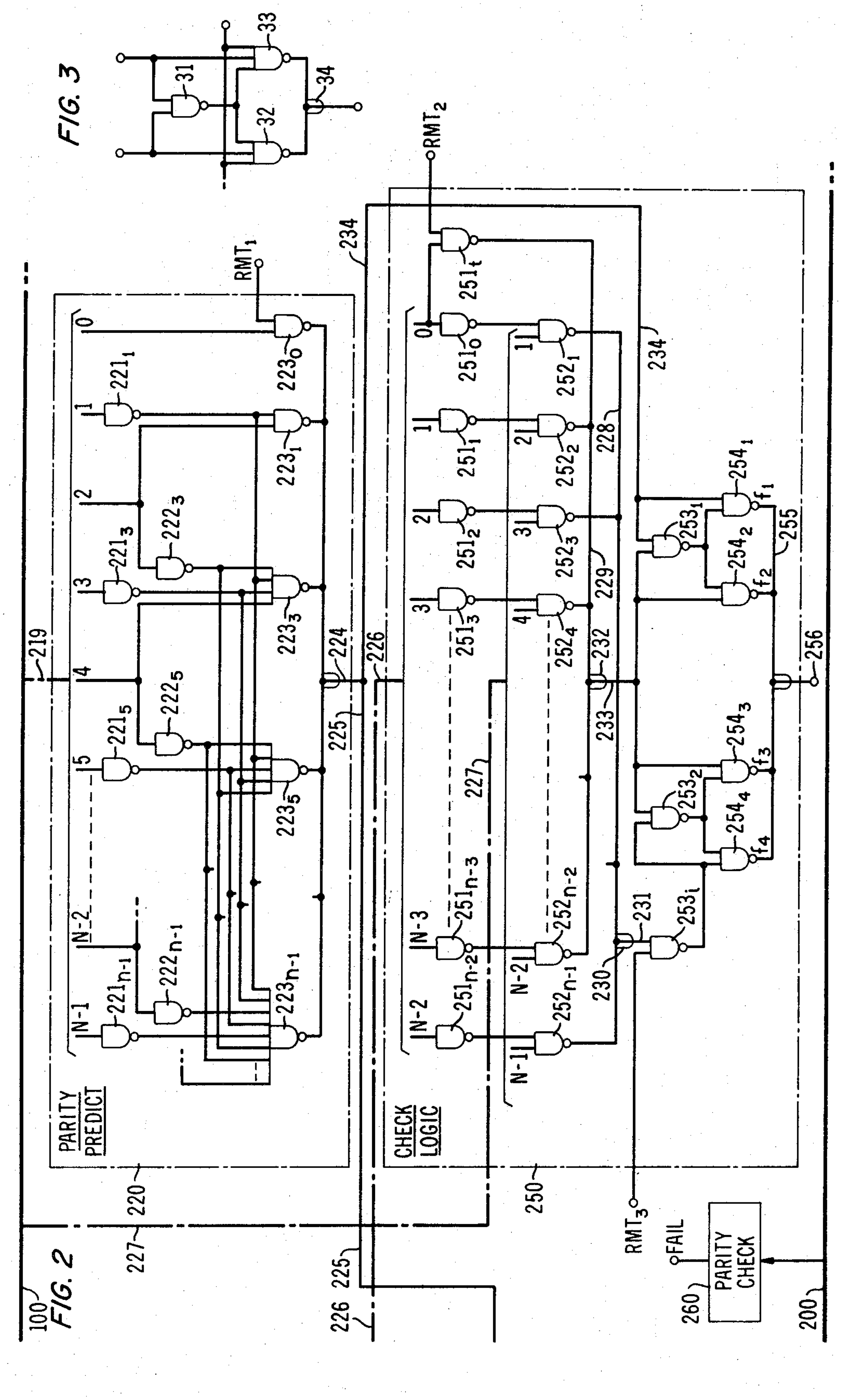
FIG. 3 depicts the details of a typical Exclusive-OR logic circuit conveniently adapted for use in this invention.

An illustrative error detection circuit according to the principles of this invention is shown in combined FIGS. 1 and 2 as selectively operable in connection with data transfers between registers accessed by two multiple lead buses 100 and 200. Although only two registers are shown in the drawing and considered hereinafter, it will be understood that in practice the buses 100 and 200 are shared by a number of registers between any two of which data may be selectively transferred. Referring specifically to FIG. 1, it will be assumed for purposes of description, that a transfer of data stored in a source register 110 is ordered therefrom to a destination register 210 in connection with a data processing operation of the system with which this invention is advantageously adapted for use. The registers 110 and 210 are of a character well known in the art and each comprises *n* flip-flop stages 0 through $n-1$ plus a parity bit stage *p*.

In a conventional manner the contents of the registers are manifested by the presence on parallel output leads of the stages of high or low voltage signal conditions as determined by the particular binary bits stored. For this description, a high voltage condition on an output lead represents the presence of a binary "1" and a low voltage condition, a binary "0." The signal conditions on the output leads of the register 110 are applied to corresponding leads of bus 100 via a plurality of respective NAND gates represented in the drawing by the single gate 111 under the control of an enable signal applied to an input of each of the gates. Similarly, data-representative signals on the bus 200 are transferred to a register such as the destination register 210 via a plurality of NAND gates, the outputs of which are connected to corresponding input leads of the stages of the destination register. These gates are represented in the drawing by the single gate 211 and are enabled concurrently with the gates 111 and terminal 154. For a transfer of data between registers without its manipulation, provision is typically made for bypassing the counter arrangement of this invention. A plurality of NAND gates, represented in the drawing by the single gate 112, enabled concurrently with the gates 111 and 211 (if the transfer is to be made between the registers 110 and 210), and connecting corresponding leads of the buses 100 and 200, are provided for this purpose. Since this invention is concerned only with transfers in which the data is incremented, no further reference need be made to the normal bus operation.

For purposes of description, the organization of a counter arrangement according to this invention may be functionally grouped into four operations: the detection of rightmost "1s" in the data word to be incremented, incrementing the latter word by one, predicting the parity of the incremented word, and checking the logic of the preceding operations. A "1s" logic circuit 120 and a count logic circuit 150 for accomplishing the first two operations are shown in detail in FIG. 1. A parity predict circuit 220 and a check logic circuit 250 for performing the last two operations are shown in FIG. 2. In the illustrative counter arrangement being described, even "1s" parity is assumed, that is, a binary "1" parity bit is added to a data word containing an odd number of binary "1s" to render the total number of "1s" in the word even. During an increment, i.e., add-one, operation on a data word, it is clear that whether a parity change is indicated may be determined by sensing a "0" immediately preceding the set of consecutive rightmost "1s" since it is only those bit positions which will be affected by the increment. Thus, a parity change is indicated when the number of consecutive rightmost "1s" is even and an unchanged parity is indicated when this number is odd. In accordance with this invention, a parity bit predicted on the basis of the set of consecutive rightmost "1s" in the data word to be incremented is generated independently of, and simultaneously with, the incrementing operation by the "1s" logic circuit 120 and count logic circuit 150 which may now be specifically considered.

Bits 0 through $n-2$ of the contents of register 110 are parallel gated therefrom via enabled NAND gates 111, bus 100, and cable 119 to corresponding input leads of the "1s" logic circuit 120. An illustrative contents of the register 110 positions 0 through $n-1$ and *p* is assumed as 1, 1, 0, O, . . . 0, the last bit indicating a parity of "0." Because of the manner of operation of the NAND gates 111, the binary values of the bits gated therethrough will be inverted. Thus, a high enable signal condition on the enable input of a gate 111 coupled with, say, a high signal condition representing a binary "1" on the enable input lead, will result in a low signal condition, i.e., representing a binary "0," on the output lead of the gate. The 0 to $n-2$ contents of register 110, as a result, appears on the corresponding input leads of circuit 120 thus: 0, 0, 1, 1, . . . At the inputs of the latter circuit a plurality of inverters $121_0$ through $121_{n-2}$ restores the input data to its original form. Thus, in accordance with the input data, the output signal levels of inverters $121_0$ and $121_1$, for example, will be high and the outputs of inverters $121_2$ and $121_3$ will be low. The outputs of all of the inverters 121 are directly applied as respective inputs to a plurality of corresponding NAND gates $122_0$ through $122_{n-2}$. Each of the foregoing direct inputs is multiplied by means of a common lead to a separate input of each of the succeeding gates 122, the first gate $122_0$ in this case acting simply as an inverter. As a result, the first rightmost "0" bit applied to a gate 122 will also be applied to each of the succeeding gates thereby rendering irrelevent the inputs thereto from the corresponding inverters 121. A set of consecutive rightmost "1s" is thus defined since a "1" input to a gate 122 will have no significant effect unless each of the preceding gate inputs is also a "1." Applied to the instant illustrative incrementing operation, this means that the set of rightmost "1" bits applied to gates $122_0$ and $122_1$ will appear on the respective outputs as low signal conditions and that the first rightmost "0" bit applied as a low level signal to the gate $122_2$ will cause the output of that gate (and the output of each of the succeeding gates) to be high. These output conditions represent a coding of the rightmost "1s" of the data being transferred and are applied via leads $123_0$ through $123_{n-2}$ to control the incrementing of the latter data. In accordance with one aspect of this invention, each stage of the "1s" logic circuit 120 controls a corresponding, but next higher order, stage of the count logic circuit 150. (For this reason, only $n-2$ stages are provided in the circuit 120.) More specifically, the coded outputs of the "1s" logic circuit 120 are applied via the leads $123_0$ through $123_{n-2}$ to the inputs of a plurality of Exclusive-OR circuits $151_1$ through $151_{n-1}$, respectively. Note that in an incrementing by one operation, the lowest order bit always changes; accordingly, the Exclusive-OR circuit $151_0$ may be controlled in a manner to be described to effect this change. The Exclusive-OR circuits 151 may conveniently be made up of NAND gates organized as shown in FIG. 3.

Briefly, the logic circuit of FIG. 3 comprises three transistor NAND gates 31, 32, and 33, the output of the first being connected as inputs to the other two. The gates are identical to those already considered in the foregoing description. In accordance with the well known transistor circuitry of the gates, the collector outputs of gates 32 and 33 are connected together with the result that if either output voltage signal is low, that is, representing a binary "0," the other will also be drawn to the low voltage level. This relationship is represented at the juncture of the outputs by the symbol 34. The Exclusive-OR circuit of FIG. 3 is typically controlled by a high-level enabling voltage applied to a control input of each of the output gates 32 and 33.

Simultaneously with the transfer from bus 100 of the 0 through $n-2$ bits of register 110 to the inputs of the "1s" logic circuit 120, the entire contents of the register 110 is transferred to the count logic circuit 150. This transfer is taken from bus 100 via a cable 149 and the data bits 0 through $n-1$ and the parity bit $p$ are applied to inverters $152_0$ through $152_{n-1}$ and $152_p$, respectively. The latter inverters serve the same reinversion function described in connection with the inverters of logic circuit 120 in the foregoing. The outputs of the inverters 152 are applied to second inputs of the corresponding Exclusive-OR circuits 151. In this case it will be noted that the bit positions of the outputs of inverters 152 correspond to the bit positions of the logic circuits 151. The latter circuits are controlled by a third input connected to a common enabling conductor 153 extending to a terminal 154 to which is applied a positive-going enabling voltage simultaneously with the enabling signal applied to the gate 111. The Exclusive-OR circuits 151 are controlled by the inputs from the gates 122 of the "1s" logic circuit 120 either to pass the data received via cable 149 from the register 110 or to invert it in accordance with the rightmost "1s" coding. As mentioned previously, the lowest order bit always changes; accordingly, one of the inputs of the circuit $151_0$ is grounded to achieve this result. The incoming "1" bit is thus inverted to become a "0" at the output of the latter circuit. Inspection of the details of a circuit 151 shown in FIG. 3 makes clear that a "1" applied to either input results in an output which is the same as the other input. On the other hand, a "0" applied to either input results in an output which is the inverse of the other input. The "0" outputs of the inverters $122_0$ and $122_1$ applied to the circuits $151_1$ and $151_2$ thus cause the data inputs of bit positions 1 and 2 to be inverted whereas the remaining bits 3 through $n-1$ pass unchanged. The parity bit logic circuit $151_p$ is controlled in a manner to be described. At this point in the description, the data output of the count logic circuit 150 appearing on the outputs of Exclusive-OR circuits $151_0$ through $151_{n-1}$ is 0, 0, 1, O, . . . 0, respectively, representing an increment of one over the data received from the register 110.

Parity prediction in accordance with this invention is accomplished concurrently with the counting operation described in the immediately foregoing by means of a parity predict circuit 220 shown in FIG. 2. Whether or not a parity change is involved as data is incremented may be determined by sensing either a "0" preceding a set of rightmost consecutive "1s" that are even in number or a "0" preceding a set of "1s" that are odd in number. The former case indicates a parity change whereas in the latter case the parity remains unchanged. The circuit 220 accomplishes the sensing of a "0" preceding a set of rightmost consecutive "1s" that are even in number. The circuit 220 is provided with a plurality of inputs 0 through $n-1$ connected to the bus 100 by cable 219 by means of which the corresponding data contents of the source register 110 are received. Beginning with the input of bit position 1, alternate inputs are provided with inverter circuits $221_3$, $221_5$, . . . $221_{n-1}$, respectively. The outputs of the inverters 221 are coupled to inputs of corresponding NAND gates $223_1$, $223_3$, $223_5$, . . . $223_{n-1}$, respectively, the outputs of which latter circuits being connected together by transistor collectors in the manner mentioned hereinbefore to provide a single output 224. Each of the bit position inputs following an even numbered input, that is, inputs 2, 4, . . . $n-2$, is connected to inputs of both the one preceding and several succeeding NAND gates 223, in the latter case, through an inverter 222. Thus, the input for bit position 2 is connected to an input of NAND gate $223_1$ and also to an input of NAND gates $223_3$, $223_5$, . . . $223_{n-1}$ in the latter case, through inverter $222_3$. Similarly, input $n-2$ is connected to an input of a NAND gate $223_{n-3}$ associated with its preceding stage and also to an input of NAND gate $223_{n-1}$ through an inverter $222_{n-1}$. The input for bit position 0 is connected directly to an input of a NAND gate $223_0$ the output of which is also connected together with the outputs of the other gates 223. Another input of gate $223_0$ is connected to a terminal $RMT_1$, the function of which will be considered hereinafter. Each output from an inverter 221 and 222 is multipled to an input of each of the succeeding NAND gates 223.

That the foregoing organization of the logic elements of the parity predict circuit 220 accurately predicts the character of the parity bit by sensing the "0" preceding an even number of consecutive rightmost "1s" may now be demonstrated. The data bits transmitted from the source register 110 via bus 100 and cable 219 arrive at the circuit 220 in inverted form due to the operation of NAND gates 111 of FIG. 1. Thus, the illustrative contents of register 110 assumed for purposes of description as consisting of the bits 1, 1, 0, 0, . . . 0 are applied to the corresponding inputs of the circuit 220 in the form of 0, 0, 1, 1 , . . . 1. The first "0" bit is applied directly to gate $223_0$, the output of which will thus be high as applied to the common output connection 224, assuming a normal high potential on its other terminal $RMT_1$. The second "0" bit is applied to inverter $221_1$, the output of which is applied as a high "1" signal to an input of NAND gate $223_1$ and therefrom to an input of each of the succeeding NAND gates 223. The first "1" bit (which corresponds to the first "0" bit preceding the rightmost consecutive "1s" of the data being considered) is applied to the other input of the NAND gate $223_1$ with the result that the output of the latter is a low voltage condition. When the collector voltage of the latter gate drops, all of the collectors of the other gates 223 are also drawn to this logic level thereby effectively applying a "0" to the common terminal 224. This logical output is applied via a conductor 225 extended to FIG. 1 and therein to the other input of the parity Exclusive-OR circuit $151_p$. The "0" thus applied is combined at that point with the "0" parity bit transferred from the register 110 to generate a new parity bit "1" at the output of the latter circuit $151_p$. The change in parity bits is thus in accord with the fact that the data word being incremented has an overall even number of "1s."

From the foregoing and from the organization of the logic elements of the parity predict circuit 220, it is apparent on cable 219 that a binary "1" input at an odd bit position (0, 2, 4 , . . . $n-2$) preceded by consecutive "0s" in the preceding bit positions will cause the output of the NAND gate 223 of the immediately preceding bit position to be a low voltage condition (the binary "1" marking the first rightmost "0" of the data being incremented). As mentioned hereinbefore, a low voltage conditioned on any one output results in a low voltage at the common output connection 224. Now assume that the data word complement being applied to the inputs of the circuit 220 on cable 219 contains a binary "1" at an even bit position (1, 3, 5 , . . . ) preceded by consecutive "0s" in the preceding bit positions. In this case, each of the preceding NAND gates 223 will have a high voltage level output and the output of the inverter 221 of the even position will ensure that the gate 223 of that position and all succeeding gates 223 will also have high output voltage levels. This voltage condition would then be transmitted via conductor 225 to the Exclusive-OR circuit $151_p$ to cause that circuit to pass the parity bit appearing on the input of inverter $152_p$ unchanged.

The organization of this invention described to this point has included circuitry for generating a first parity change bit "0" simultaneously with, but independently of, the previously considered counting logic. Two additional parity change bits are generated by logic circuitry dependent upon the operation of the counting logic. In accordance with this invention, the three parity change bits are then compared to check the accuracy of the counting operation. Any disagreement among the parity change bits indicates an error in either the counting or checking operation. The two additional parity change bits are generated and their accuracy checked in a check logic circuit 250 shown in FIG. 2. As there shown, the circuit 250 comprises four levels of gates 251, 252, 253, and 254. The first level of gates comprises a plurality of inverters $251_0$ through $251_{n-2}$ and a NAND gate $251_t$, the inverters having their inputs connected via a cable 226 extended to FIG. 1 to the outputs of gates $122_0$ through $122_{n-2}$, respectively. One of the inputs of the NAND gate $251_t$ is connected to the input of inverter $251_0$, the other input is extended to a terminal $RMT_2$, the function of which will be considered hereinafter. The outputs of the first level gates are connected to correspondingly first inputs of a plurality of second level NAND gates $252_1$ through $252_{n-1}$, respectively. Simultaneously with the transfer of the contents of the register 110 to previously described circuits via gates 111 and bus 100, the bits 1 through $n-1$ are applied to the other inputs of the NAND gates $252_1$ through $252_{n-1}$ via a cable 227. The two additional parity change bits are generated at the outputs of alternate groupings of the NAND gates 252. Thus, the outputs of the gates $252_2$, $252_4$ , . . . $252_{n-2}$ are connected together by means of a common conductor 229. Also connected to the latter conductor is an output of the first level NAND gate $251_t$. The outputs of the remaining gates $252_1$, $252_3$ , . . . $252_{n-1}$ are connected together by means of a second common conductor 228. As pointed out in the foregoing, the common conductors 228 and 229 represent the connecting together of transistor collectors of the individual gates 252 in a manner so that if the potential at any collector of the common group falls, the remaining collectors are drawn to the lower potential. This relationship is represented for the conductor 228 by the symbol 230 in FIG. 2, the common potentials appearing on an output 231. For the conductor 229 a common output 233 is shown at their juncture represented by the symbol 232.

It will be recalled that, in accordance with the data word being transferred from the register 110, the outputs of the second level gates $122_0$ through $122_{n-2}$ of the logic circuit 120 of FIG. 1 were the bits O, O, 1, 1 , . . . 1, respectively, indicating that the data word stored in the register 110 had two consecutive rightmost "1s." These bits are applied via cable 226 to the inputs of corresponding inverters $251_0$ through $251_{n-2}$ and $251_t$, respectively, the complements of these bits appearing on the outputs of the latter elements as the bits 1, 1, 0, O , . . . 0. These bits are applied to a second level plurality of NAND gates 252, shifted, however, one bit position to the left. Thus, the outputs of the inverters $251_0$ through $251_{n-2}$ are applied to respective inputs of the NAND gates $252_1$ through $252_{n-1}$. Simultaneously, with the transfer of the information from the register 110 to the logic circuit 120, to count logic circuit 150, and to the parity predict circuit 220 as previously described, the bits 1 through $n-1$ are applied via the bus 100 and cable 227 from the register 110 to the other individual inputs of the NAND gates 252. The latter gates are grouped in association with alternate ones of the inverters 251 to generate a pair of parity change bits at two common output points. More specifically, the outputs of the gates $252_1$, $252_3$ , . . .

$252_{n-1}$ associated with the inverters $251_O$, $251_2$, . . . $251_{n-2}$ are grouped by means of a common conductor 228 connecting the collectors of the output transistors of these circuits symbolized at 230 to provide a common output terminal 231. In a similar manner, the outputs of the gates $252_2$, $252_4$, . . . $252_{n-2}$ associated with the inverters $251_1$, $251_3$, . . . $251_{n-3}$ are grouped by means of a common conductor 229 connecting the collectors of the output transistors of these circuits symbolized at 232 to provide a common output terminal 233.

Two parity change bits are thus generated at the terminals 231 and 233, as will appear hereinafter, one being the complement of the other. Since parity will always change when the rightmost bit position contains a binary "O," this bit is applied to both circuits via gate $251_t$ and inverter $251_O$. The coded information received from the logic circuit 120 via the cable 226 and applied to inputs of the gates 252 after inversion by the inverters 251, includes, it will be recalled, a "1" on an input of the gate $252_2$. At the same time a binary "1" is being applied to the other input of the gate $252_2$ from the source register 110 (via a corresponding gate 111, bus 100, and cable 227). As a result, the output of the gate $252_2$ will be a low signal condition indicative of a binary "0" and, whatever the outputs of the other gates 252 connected by the common conductor 229, a "0" will also appear on the output terminal 233 representing a second parity change bit. In order to achieve an ultimate match of the parity change bits, the complement of the latter parity change bit must appear on the other terminal 231. In the illustrative case being described, this follows from the information bits being applied to the first and second level gates 251 and 252 wherein a binary "0" is applied to one of the inputs of each of the gates $252_1$, $252_3$, . . . $252_{n-1}$. As a result, the outputs of each of the latter gates will be high, a binary "1" to appear on the third parity change output terminal 231. In order to accomplish an ultimate match among the three parity change bits generated as described in the foregoing, the latter parity bit is inverted at a third level NAND gate $253_i$ having one of its inputs connected to the output terminal 231. The other input of the gate $253_i$ is connected to an $RMT_3$ terminal the purpose of which will be described hereinafter. At this point it may be noted that, as was the case in connection with the terminal $RMT_1$, a normal high potential is maintained on the inputs $RMT_2$, and $RMT_3$ to ensure their operation as inverters during a normal parity predict function.

At this point, three parity change bits have been generated: a "0" at the output terminal 224 of parity predict circuit 220, a "0" at the output terminal 233 of check logic circuit 250, and a "0" at the output terminal of NAND gate $253_i$ of the latter circuit. These bits are compared by two Exclusive-OR circuits of the character depicted in FIG. 3 made up of the third and fourth level NAND gates 253 and 254. The first parity change bit "0" is transmitted from the terminal 224 of circuit 220 via a conductor 234 to one of the inputs of the first Exclusive-OR circuit made up of NAND gates $253_1$, $254_1$, and $254_2$, the other input of the latter circuit being connected to terminal 233 to receive the second parity change bit "0" there generated. The latter parity change bit is also applied to one of the inputs of the second Exclusive-OR circuit made up of NAND gates $253_2$, $254_3$, and $254_4$, the other input of the latter circuit being connected to the output of NAND gate $253_i$ to receive the third parity change bit "0" there generated. The outputs of the two Exclusive-OR circuits are connected together by means of a common conductor 255 in the collector output mode described hereinbefore to provide a common output terminal 256. It will be apparent from the operation of the Exclusive-OR circuits previously described, that if each of the inputs to the latter circuits is a binary "0" or, in the alternate, each of the latter inputs is a binary "1," the output generated at the output terminal 256 will be a binary "1" thereby indicating that the parity change bits matched and that the parity predicted for the incrementing operation was correct. On the other hand, had a binary "0" appeared on the terminal 256, this would have indicated to the system with which the invention is adapted for use the fact of a mismatch resulting from some malfunction in the transmission of the data or in the check or incrementing operation.

The incremented data together with the new parity bit, the generation of which was described in the foregoing, is applied via a cable 153 and the bus 200 to the parallel inputs of the destination register 210 and the illustrative transfer operation is completed. It may be added that, conventionally, a parity check circuit 260 is provided to ensure that the new parity bit generated (and predicted) is indeed the parity over the incremented output data transferred to the register 210. One final aspect of this invention remains to be described.

It will be apparent that when a fail signal appears on the terminal 256 of the check logic circuit 250 of FIG. 2, this could be the result of faults occurring in circuits 120, 220, and 250. Of primary importance is the detection of faults occurring in gates 121 and 122 which cause the multiple bit errors. In order to verify the integrity of the match logic certain routine maintenance may be performed. Routine maintenance test terminals $RMT_1$, $RMT_2$, and $RMT_3$, previously identified, are provided which are routinely exercised under the control of a central processor according to the pattern below to identify the faults which may be designated $f_1$, $f_2$, $f_3$, and $f_4$ attributed to the gates $254_1$, $254_2$, $254_3$, and $254_4$, respectively. In their normal state, the RMT terminals are maintained at a high potential indicative of a binary "1." During a routine maintenance test, a data word is gated from memory under central control of a processor to apply a test word, such as one containing the bits 1, 1, 1, . . . 1, 1, 0, to the bus 100 and thereby to the circuits of this invention. If at the same time the RMT terminals are energized according to the following table and no fail signal appears on the terminal 256, the faults of the gates 254 are as indicated:

| $RMT_1$ | $RMT_2$ | $RMT_3$ | Fault |
|---|---|---|---|
| 0 | 1 | 1 | $f_1$ |
| 1 | 0 | 0 | $f_2$ |
| 0 | 0 | 1 | $f_3$ |
| 1 | 1 | 0 | $f_4$ |

What has been described is considered to be only one illustrative embodiment of this invention and it will be apparent to one skilled in the art that various and numerous other arrangements may be devised without departing from the spirit and scope of the accompanying claims. For example, it will be apparent that the need for the inverters 121 and 151 could in practice be obviated by substituting other gating means for the NAND gates 111 which would pass the data from the source register 110 in its original form. The actual construction of this invention, however, was facilitated by advantageously employing NAND gates as universally applicable logic building blocks. As a result, it will be appreciated that, here and elsewhere, logic operations are conveniently adapted to make their general use practicable. The particular logic elements employed are thus not to be regarded as in any way limiting the scope of this invention.

What is claimed is:

1. A count circuit for incrementing an input data word comprising a plurality of data bits and a parity bit, said count circuit comprising coding circuit means responsive to binary signals representing said data bits for generating coded output signals indicative of particular bits of said data bits to be changed, a first and a second parity predict circuit means for comparing said coded output signals and said binary signals to generate a first and a second parity change information signal, third parity predict circuit means responsive to said binary signals for generating a third parity change information signal, count logic circuit means responsive to said binary signals and said coded output signals for generating an output count comprising incremented data bits and responsive to a binary signal representing said parity bit and said third parity change information signal for generating a parity bit for said output count, and check logic circuit means for comparing said first, second, and third parity change information signals to generate an output signal indicating when said last-mentioned signals match.

2. A count circuit for incrementing an input count comprising a plurality of data bits and a parity bit, said count circuit comprising coding circuit means responsive to input binary signals representing said data bits for generating coded output signals indicative of particular bits of said data bits to be changed to form an output count, a first parity predict circuit means for comparing said coded output signals and said input binary signals to generate a first parity change information signal, a second parity predict circuit means responsive to said input binary signals for generating a second parity change information signal, count logic circuit means responsive to said input binary signals and said coded output signals for generating an output count comprising incremented data bits, said count logic circuit means also responsive to a binary signal representing said parity bit and said second parity change information signal for generating a parity bit for said output count, and check logic circuit means for comparing said first and second parity change information signals to generate a fail signal when said last-mentioned signals fail to match.

3. A count circuit as claimed in claim 2 in which said coding circuit means and said second parity predict circuit means each comprises circuit means for detecting the rightmost consecutive binary "1s" in said data bits of said input count.

4. A counting circuit for incrementing an input data word comprising a plurality of binary data bits and a binary parity bit, said counting circuit comprising coding circuit means for detecting particular bits of said data bits to be complemented during said incrementing to generate a plurality of code bits indicative of said particular bits, first parity predict circuit means, responsive to said input data word, for predicting a change in parity during said incrementing and for generating a first parity change bit in accordance with said change, second parity predict circuit means, responsive to said input data word and said plurality of code bits, for predicting a change in parity during said incrementing and for generating a second parity change bit in accordance with said last-mentioned change, count logic circuit means for incrementing said data bits as determined by said code bits and for generating an output parity bit as determined by said first parity change bit, and check logic circuit means for comparing said first and said second parity change bits to generate a fail signal when said last-mentioned bits fail to match.

5. A counting circuit for incrementing an input data word comprising a plurality of binary data bits and a binary parity bit, said counting circuit comprising coding circuit means for detecting particular bits of said data bits to be complemented during said incrementing to generate a plurality of code bits corresponding to said binary data bits indicative of said particular bits, first parity predict circuit means for predicting a change in parity during said incrementing and for generating a first parity change bit in accordance with said change, second parity predict circuit means for predicting a change in parity in the even bits of said data bits during said incrementing as determined by the corresponding even bits of said code bits and for generating a second parity change bit in accordance with said last-mentioned change, third parity predict circuit means for predicting a change in parity in the odd bits of said data bits during said incrementing as determined by the corresponding odd bits of said code bits and for generating a third parity change bit in accordance with said last-mentioned change, count logic circuit means for incrementing said data bits as determined by said code bits and for generating an output parity bit as determined by said first parity change bit, and check logic circuit means for comparing said first, second, and third parity change bits to generate a fail signal when said last-mentioned bits fail to match.

6. A self-checking counting circuit comprising a logic circuit for detecting in an input data word comprising a plurality of data bits and an input parity bit the rightmost binary bit of one value followed by a set of rightmost consecutive bits of the other value and for generating code bits indicative of said rightmost bits, a count logic circuit for logically combining said plurality of input data bits and said code bits to obtain an incremented data word, a first parity predict circuit means for detecting whether said set of rightmost consecutive bits is odd or even in number and for generating a first parity change bit in accordance therewith, logic circuit means for logically combining said input parity bit and said first parity change bit for generating a parity bit for said incremented data word, a second parity predict circuit means for logically combining said code bits and even numbered ones of said input data bits to obtain a second parity change bit, and check logic circuit means for comparing said first and second parity change bits to generate a fail signal when said last-mentioned bits fail to match.

7. A self-checking counting circuit according to claim 6 also comprising a third parity predict circuit means for logically combining said code bits and odd numbered ones of said input data bits to obtain a third parity change bit, said check logic circuit means also comparing said third parity change bit with said first and second parity change bits to generate a fail signal when said last-mentioned bits fail to match.

8. In a data processing system, in combination, a source register containing a plurality of data bits and an initial parity bit, a coding logic circuit means for generating code bits indicative of the particular bits of a plurality of bits applied thereto which will be complemented during an incrementing operation, a count logic circuit means operated responsive to said code bits for incrementing data bits applied thereto, means for concurrently transferring said plurality of data bits to said coding logic circuit means and to said count logic circuit means to obtain an incremented output plurality of data bits, a first parity predict circuit means for predicting the parity of data bits applied thereto when incremented to generate a first parity change bit, means for applying said first parity change bit and said initial parity bit to said count logic circuit means concurrently with said plurality of data bits to generate an output parity bit, a second parity predict circuit means controlled by said code bits for predicting the parity of the odd positioned bits and of the even positioned bits of data bits applied thereto to generate a second and a third parity change bit, means for applying said plurality of data bits to said first and second parity predict circuit means concurrently with their application to said coding and count logic circuit means, means for transferring said output plurality of data bits and said output parity bit to a destination register, and check logic circuit means for comparing said first, second, and third parity change bits to generate a fail signal when said last-mentioned bits fail to match.

9. A counting circuit comprising a coding logic circuit for generating a plurality of code bits indicative of changes between a plurality of input data bits and an increment of said data bits, a count logic circuit responsive to said code bits for incrementing said plurality of input data bits, a first parity predict circuit, responsive to said input data bits, for predicting the parity of said increment independently of said count logic to generate a first parity change bit in accordance therewith, a second parity predict circuit, responsive to said code bits and said input data bits, for predicting the parity of said increment dependent on said coding logic circuit to generate a second parity change bit in accordance therewith, and a check logic circuit for comparing said first and second parity change bits to generate a fail signal when said last-mentioned bits fail to match.

10. A counting circuit as claimed in claim 9 in which said count logic circuit comprises means for comparing the parity of said plurality of input data bits and said first parity change bit for generating an output parity bit for said increment.

* * * * *